United States Patent [19]

Cukelj

[11] Patent Number: 4,512,696

[45] Date of Patent: Apr. 23, 1985

[54] DRAW BAR FOR MACHINE TOOL

[76] Inventor: Mirko Cukelj, 11459 Chapin St., Chesterland, Ohio 44092

[21] Appl. No.: 510,987

[22] Filed: Jul. 5, 1983

[51] Int. Cl.³ .............................................. B23B 31/10
[52] U.S. Cl. ........................................ 409/233; 279/8; 408/239 A
[58] Field of Search ........................ 408/239 R, 239 A; 279/7, 8, 42, 43; 409/233; 411/39, 40, 41, 42, 43, 356, 412, 351, 390, 391, 417, 423

[56] References Cited

U.S. PATENT DOCUMENTS

| Re. 26,623 | 7/1969 | Erikson | 409/233 X |
|---|---|---|---|
| 3,397,615 | 8/1968 | Meinke | 409/233 |
| 3,691,900 | 9/1972 | Novak et al. | 409/233 |
| 3,818,797 | 6/1974 | Zettler | 409/233 |
| 3,868,886 | 3/1975 | Bondie | 409/233 |
| 3,945,752 | 3/1976 | Bennett | 408/239 A X |
| 4,167,218 | 9/1979 | Horivchi et al. | 409/233 X |
| 4,175,898 | 11/1979 | Wood | 409/233 |

*Primary Examiner*—William R. Briggs
*Assistant Examiner*—Glenn L. Webb
*Attorney, Agent, or Firm*—Frank B. Robb

[57] ABSTRACT

A draw bar for collet chucking spindles having an elongated body with a wrench head, a removable spacer positioned adjacent the head and first and second thread sections at the opposite end of the body, the first section being removed when the threads become worn and the second section being thereby accessible for collet operation, the spacer being then removed likewise to operate a collet.

4 Claims, 3 Drawing Figures

DRAW BAR FOR MACHINE TOOL

BACKGROUND AND DESCRIPTION OF THE INVENTION

This invention relates to a draw bar construction for collet chucking spindles, such spindles being those usually used in machine tools and in this particular instance especially arranged for use in conjunction with what is known as a Bridgeport milling machine, which is a well known vertical type machine tool of very versatile application.

A machine tool of this nature, includes a spindle, hollow and which is designed to be driven at various varying speeds by suitable motor, the entire unit mounted in what may be termed a vertical fashion on a column and with a suitable table upon which the workpieces may be supported.

The spindle of the machine is in turn arranged to have supported on its lower end a collet in most uses in which is intended to be engaged a tool for operation on part supported on the table.

It is thus necessary to have the collet operated and to this end the spindle is hollow and a draw bar of known configuration is arranged to be received within the spindle and in turn engage the collet to draw the same inwardly and outwardly and thus grip the tool for rotation and application to the workpiece supported in position therefore.

The foregoing is generally conventional and specifically the drawbar currently availed of includes a wrench head at one end, having normally the usual six sided or hexagonal flat faces of elongated nature, with a face adapted at its lower end to engage the spindle and draw up the bar, which in turn is provided at its lower extremity with threads for contact with the collet which is carried in the spindle and in turn grips the tool for operation thereof.

Wear takes place on the threaded portion of these drawbars and eventually is sufficient to require that they be replaced if other means for extending the lift are not provided.

In this particular invention, there is disclosed and availed of an arrangement of drawbar which involves the use of an elongated body of conventional form having a wrench head at one end and the threaded area at the opposite, but in this instance the threaded area is of elongated nature and separated by a notch or V section, at which point the extreme end thread or first section thread could be removed when worn thus bringing into position the second section thread for operation and engagement with the collet.

However since this will necessarily shorten the length of the drawbar body, a suitable spacer is necessary to provide and that is arranged so as to be removed from the body and thus again make the relationship between the wrench head and the threads such as to be able to operate the collet.

With the foregoing explanation and general arrangement of the invention in mind, other objects and ends with purposes of the invention will be understood from a consideration of the specification appended hereto and disclosed in the drawing wherein.

DETAILED DESCRIPTION OF THE INVENTION

Figure 1:
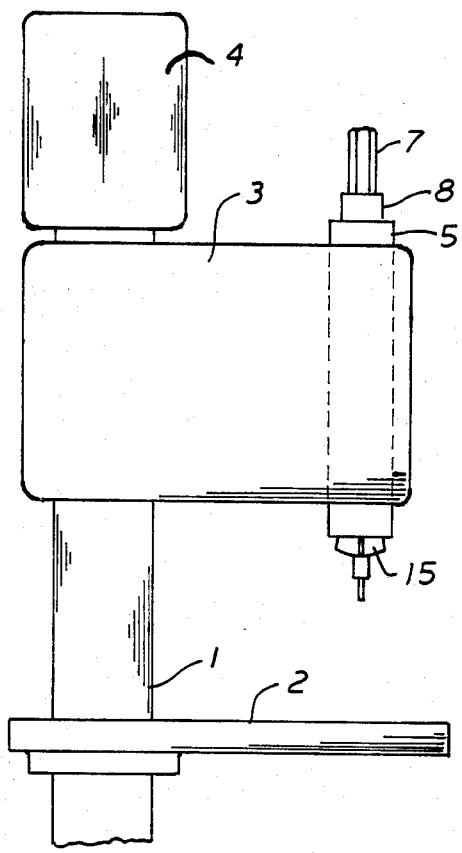
FIG. 1 is a side view in elevation and somewhat fragmentary illustrating a machine tool in which the invention may be incorporated.
Figure 3:
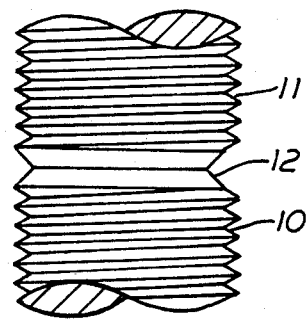
FIG. 3 is an enlarged fragmentary view showing the notched arrangement between the thread sections of the drawbar.

Referring to FIG. 1, the machine tool hereof is shown as comprising a column 1 upon which a table 2 adapted to support workpieces is in turn arranged to be located, with a spindle head 3 supported on the column and driven by a motor such as 4.

Figure 2:
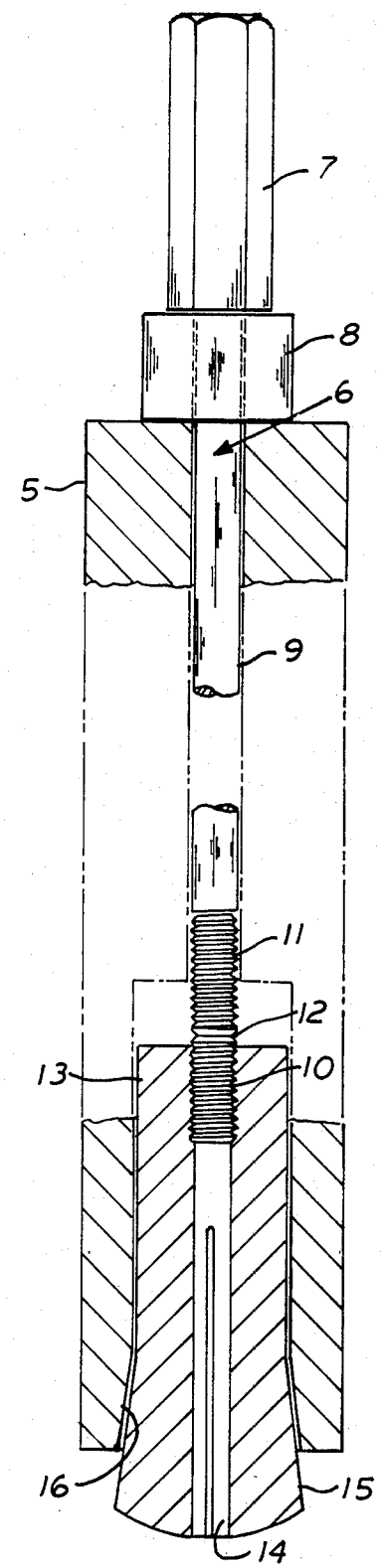
FIG. 2 is a fragmentary view in section of a spindle showing the parts of the invention hereof in position and actuated arrangement.

It will be appreciated that this is largely representative and not intended to be detailed accurately of any particular machine tool, but in any event a spindle such as indicated at 5 is positioned in the head 3 and shown in further detail in FIG. 2 as including suitable bearing surfaces in which is received the drawbar generally designated 6 having a wrench head 7 at its one end, which includes the hexagonal faces thereon and adjacent that head and beneath the same in this instance is a spacer designated 8 of substantial length which is free to be removed from the drawbar, the body of the drawbar indicated at 9 being cylindrical and of rod-like configuration.

The body 9 in turn is provided at its lower end with a first thread section designated 10 and a second thread section designated 11 which are separated by a V notch 12.

The thread section 10 is shown in this current instance as engaging a collet 13 which is of usual configuration and by suitable application of threading action to the collet will engage a tool entered in the collet opening designated 14 as determined by the angle of the exterior surface of the collet 15 in engagement with a mating surface 16 formed in the spindle 5, this being the usual manner of operation as will be understood.

As suggested initially, by long use the threads 10 will wear, and are designed to wear more quickly than those in the collet and thus ultimately become so worn as to possibly even slip with relation to the threads on the collet.

In that instance the drawbar 6 is removed and the section 10 being the first section is removed at the notch and then the drawbar is able to be replaced after first of course having removed the spacer 8 so that the relationship between the threads and the wrench head is again established as initially necessary.

Thus with the spacer 8 removed the threads 11 will engage with the collet 13 and cause the same to be actuated in the desired manner for machining purposes and the tool gripping thereby.

It is thus clear from the foregoing that a drawbar having substantially longer life is provided and in effect doubling the life of the drawbar as will be understood because the threads now presented for engagement with the collet are in all sense equal to those initially engaging the collet.

I claim:

1. A draw bar for collet chucking spindles comprising an elongated body having a wrench head at one end, first and second thread sections for collet operation at the opposite end, said first and second thread sections being of like configurations, means defining said sections to be separate, said sections being initially integral, said first section being at the extremity and subject to initial use for collet actuation, removal of said first section being effected by severing the same from the second section when thread wear diminishes the actuating power thereof, the second section being thereby engageable with the collet for operation thereof.

2. A draw bar as claimed in claim 1, wherein a spacer is positioned on the body in engagement with the wrench head, and is removed with the first thread section is removed to facilitate collet operation.

3. A draw bar as claimed in claim 1, wherein the body is a cylindrical member positioned in a machine spindle which is arranged to receive a collet, the first thread section being initially engaged therewith, the wrench head extending from the opposite end of such spindle, a spacer is positioned intermediate the head and spindle end, and the second thread section is engaged with such collet when the spacer is removed.

4. A draw bar as claimed in claim 1, wherein the thread sections are separated by a notch area, which defines the section to be removed when it becomes worn.

* * * * *